(12) United States Patent
Hayashi et al.

(10) Patent No.: US 11,492,781 B2
(45) Date of Patent: Nov. 8, 2022

(54) WORK VEHICLE

(71) Applicant: KOMATSU LTD., Tokyo (JP)

(72) Inventors: Keiichi Hayashi, Tokyo (JP); Masanori Ikari, Tokyo (JP); Hirotaka Kamekura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 489 days.

(21) Appl. No.: 16/477,648

(22) PCT Filed: Jun. 21, 2018

(86) PCT No.: PCT/JP2018/023659
§ 371 (c)(1),
(2) Date: Jul. 12, 2019

(87) PCT Pub. No.: WO2019/031074
PCT Pub. Date: Feb. 14, 2019

(65) Prior Publication Data
US 2019/0360173 A1 Nov. 28, 2019

(30) Foreign Application Priority Data
Aug. 11, 2017 (JP) .............................. JP2017-156239

(51) Int. Cl.
*E02F 9/22* (2006.01)
*B62D 5/065* (2006.01)
(Continued)

(52) U.S. Cl.
CPC .............. *E02F 9/225* (2013.01); *B62D 5/065* (2013.01); *B62D 5/09* (2013.01); *B62D 5/20* (2013.01); *B62D 12/00* (2013.01); *B62D 5/063* (2013.01)

(58) Field of Classification Search
CPC .......... E02F 9/225; B62D 5/065; B62D 5/09; B62D 5/20; B62D 12/00; B62D 5/063
(Continued)

(56) References Cited

U.S. PATENT DOCUMENTS 7,634,909 B1 * 12/2009 Chatterjea .............. B62D 5/061
 180/442
7,881,841 B2 * 2/2011 Dattilo ................... B62D 6/008
 701/42

(Continued)

FOREIGN PATENT DOCUMENTS

CN 203623770 U 6/2014
EP 2 221 234 A2 8/2010
(Continued)

OTHER PUBLICATIONS

English translation of JP 2005-205924 obtained from Espacenet.com (Year: 2005).*

(Continued)

*Primary Examiner* — Kevin Hurley
*Assistant Examiner* — Harold Eric Pahlck, III
(74) *Attorney, Agent, or Firm* — Global IP Counselors, LLP

(57) ABSTRACT

A work vehicle includes a steering wheel, a steering cylinder, a steering valve, a feed line, a return line, an electromagnetic valve, and a controller. The steering valve is configured to supply hydraulic fluid to the steering cylinder in response to steering of the steering wheel. The feed line is configured to feed the hydraulic fluid from the steering valve to the steering cylinder. The return line is configured to return the hydraulic fluid from the steering cylinder to the steering valve. The electromagnetic valve is disposed (Continued)

between the feed line and the return line. The controller opens the electromagnetic valve in response to an oil pressure in the feed line.

8 Claims, 6 Drawing Sheets

(51) Int. Cl.
  *B62D 5/09* (2006.01)
  *B62D 5/20* (2006.01)
  *B62D 12/00* (2006.01)
  *B62D 5/06* (2006.01)

(58) Field of Classification Search
  USPC .......................................................... 180/418
  See application file for complete search history.

(56) References Cited

U.S. PATENT DOCUMENTS

| | | | |
|---|---|---|---|
| 2005/0087386 A1* | 4/2005 | Hennemann | B62D 12/00 180/418 |
| 2006/0248883 A1 | 11/2006 | Gehlhoff | |
| 2012/0118661 A1 | 5/2012 | Kodera et al. | |
| 2014/0246264 A1* | 9/2014 | Alderson | B62D 6/008 180/432 |

FOREIGN PATENT DOCUMENTS

| | | | | |
|---|---|---|---|---|
| JP | 2001-151131 A | | 6/2001 | |
| JP | 2005-205924 | * | 8/2005 | ............ B62D 13/02 |
| JP | 2005-205924 A | | 8/2005 | |
| JP | 2005205924 | * | 8/2005 | ............ B62D 13/02 |
| JP | 2006-316998 A | | 11/2006 | |
| JP | 2007-203832 A | | 8/2007 | |
| JP | 2008-149872 A | | 7/2008 | |
| JP | 2009-154769 A | | 7/2009 | |
| JP | 4379986 B2 | | 10/2009 | |
| WO | 2011/121886 A1 | | 10/2011 | |

OTHER PUBLICATIONS

English translation of JP2005-205924 obtained from www.espacenet.com (Year: 2005).*
The Office Action for the corresponding Japanese application No. 2017-156239, dated Jun. 22, 2021.
The International Search Report for the corresponding international application No. PCT/JP2018/023659, dated Sep. 18, 2018.
The Office Action for the corresponding Chinese application No. 201880006467.3, dated Dec. 30, 2020.

* cited by examiner

WORK VEHICLE

CROSS-REFERENCE TO RELATED APPLICATIONS

This application is a U.S. National stage application of International Application No. PCT/JP2018/023659, filed on Jun. 21, 2018. This U.S. National stage application claims priority under 35 U.S.C. § 119(a) to Japanese Patent Application No. 2017-156239, filed in Japan on Aug. 11, 2017, the entire contents of which are hereby incorporated herein by reference.

BACKGROUND

Field of the Invention

The present invention relates to a work vehicle.

Background Information

Dislocation (so-called "knob dislocation") may occur between the steering angle and the actual steering angle of a steering wheel due to the leakage of hydraulic fluid from a hydraulic circuit between a hydraulic pump and a steering cylinder in a work vehicle. Japanese Patent Laid-open No. 2005-205924 discloses a technique for providing, in a hydraulic circuit, a knob dislocation correction valve for correcting the knob dislocation.

In addition, the load pressure in the steering cylinder may rise quickly and produce a shock when starting to turn the steering wheel in a work vehicle. Accordingly, Patent Japanese Patent Laid-open No. 2005-205924 discloses a technique for using a cushioning circuit connected to a feed line which flow hydraulic fluid to the steering cylinder and connected to a return line which flow hydraulic fluid from the steering cylinder, and allowing hydraulic fluid to flow from the feed line to the return line for a predetermined time period from when starting to turn the steering wheel.

SUMMARY

However, while the cushioning circuit described in Japanese Patent Laid-open No. 2005-205924 is useful for reducing the shock when starting to turn the steering wheel, the shock cannot be reduced when returning the steering wheel.

The hydraulic circuit becomes overly complex when a cushioning circuit for reducing the shock when returning the steering wheel is further provided separately from the knob dislocation correction valve and the cushioning circuit for reducing the shock when starting to turn the steering wheel in the hydraulic circuit described in Japanese Patent Laid-open No. 2005-205924.

Taking the above problem into consideration, an object of the present invention is to provide a work vehicle that can, with a simple configuration, reduce shock and can correct knob dislocation when starting to turn and when returning the steering wheel.

A work vehicle according to the present invention has a steering wheel, a steering cylinder, a steering valve, a feed line, a return line, an electromagnetic valve, and a controller. The steering valve is configured to supply hydraulic fluid to the steering cylinder in response to the steering angle of the steering wheel. The feed line is configured to feed the hydraulic fluid from the steering valve to the steering cylinder. The return line is configured to return the hydraulic fluid from the steering cylinder to the steering valve. The electromagnetic valve is disposed between the feed line and the return line. The controller is configured to open the electromagnetic valve in response to an oil pressure in the feed line.

The controller in the work vehicle according to the present invention preferably opens the electromagnetic valve when an actual frame angle of a front frame with respect to a rear frame is larger than a desired frame angle corresponding to the steering angle detected by a steering angle sensor.

According to the present invention, a work vehicle can be provided that can, with a simple configuration, reduce shock when starting to turn the steering wheel and when returning the steering wheel, and can correct knob dislocation.

DETAILED DESCRIPTION OF EMBODIMENT(S)

An example of a "work vehicle" will be explained hereinbelow with reference to the drawings. However, the scope of the present invention is not limited to the following embodiments and may be changed as desired within the scope of the technical concept of the present invention.

For example, although a wheel loader is discussed as an example of the work vehicle according to the present invention in the following explanations, the present invention may be mode widely applicable to a motor grader, a dump truck, or the like in addition to the wheel loader.

In the present description, "front" is a term that indicates the forward travel direction of the work vehicle, and "rear" indicates the reverse travel direction of the work vehicle. In addition, "left" and "right" are terms relative to the traveling direction when the work vehicle is traveling forward.

Overall Configuration of Wheel Loader 1

Figure 1:
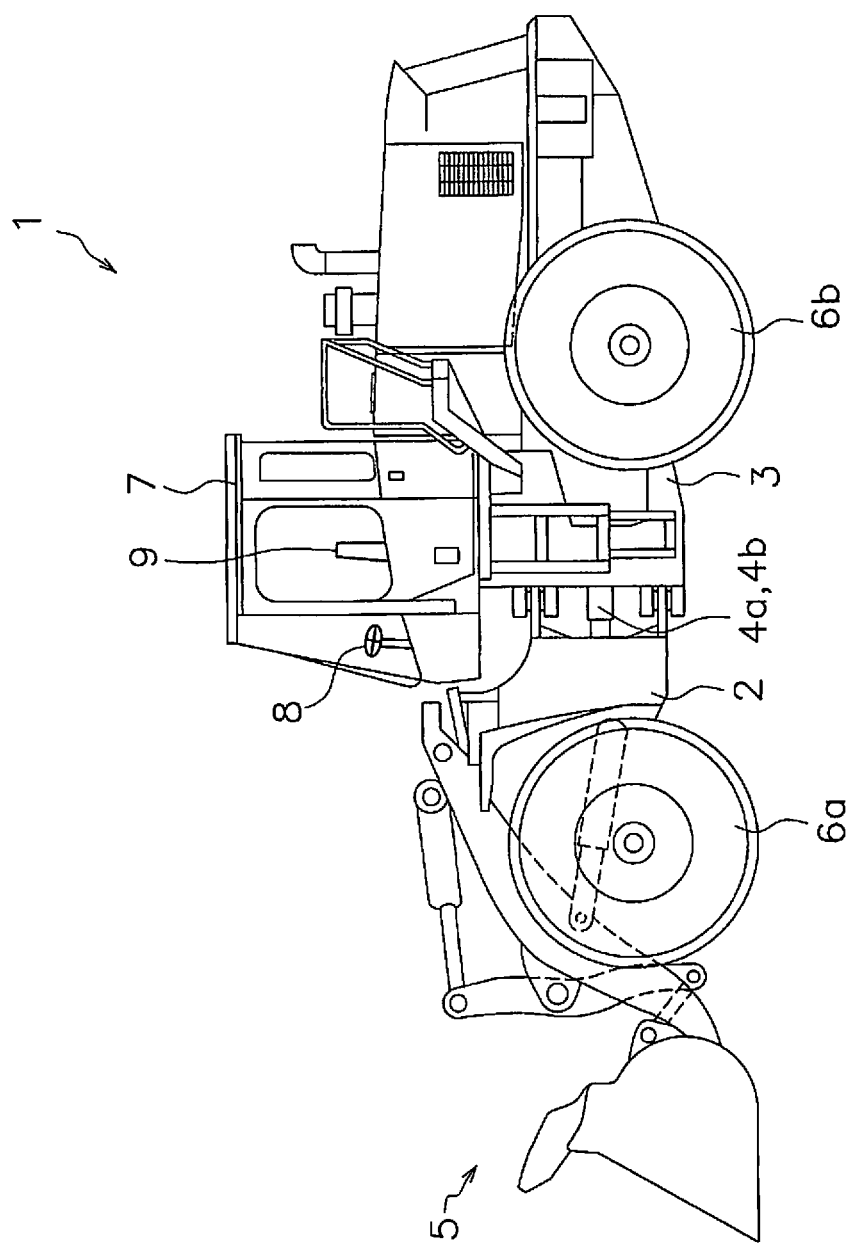
FIG. 1 is a side view of a wheel loader according to an embodiment.

FIG. 1 is a side view of an overall configuration of a wheel loader 1 according to the present embodiment.

The wheel loader 1 is used for transporting excavated earth and sand and the like and loading the earth and sand onto a truck or the like. The wheel loader 1 is provided with a front frame 2, a rear frame 3, left and right steering cylinders 4a, 4b, and a work implement 5.

The front frame 2 is coupled to the rear frame 3 via the left and right steering cylinders 4a, 4b. The left and right steering cylinders 4a, 4b extend and contract due to the supply and discharge of hydraulic fluid, whereby the front frame 2 bends to the left or right with respect to the rear frame 3. The front frame 2 is able to pivot within a predetermined frame angle range with respect to the rear frame 3. The work implement 5 is supported in a pivotable manner at the front of the front frame 2. The front frame 2 is supported by front wheels 6a.

The rear frame 3 is disposed to the rear of the front frame 2. A cab 7 is disposed on the rear frame 3. A steering wheel 8 and a seat 9 are contained inside the cab 7. The steering wheel 8 is disposed in front of the seat 9 on which an operator sits. The rear frame 3 is supported by rear wheels 6b.

Hydraulic Circuit 10 of Wheel Loader 1

Figure 2:
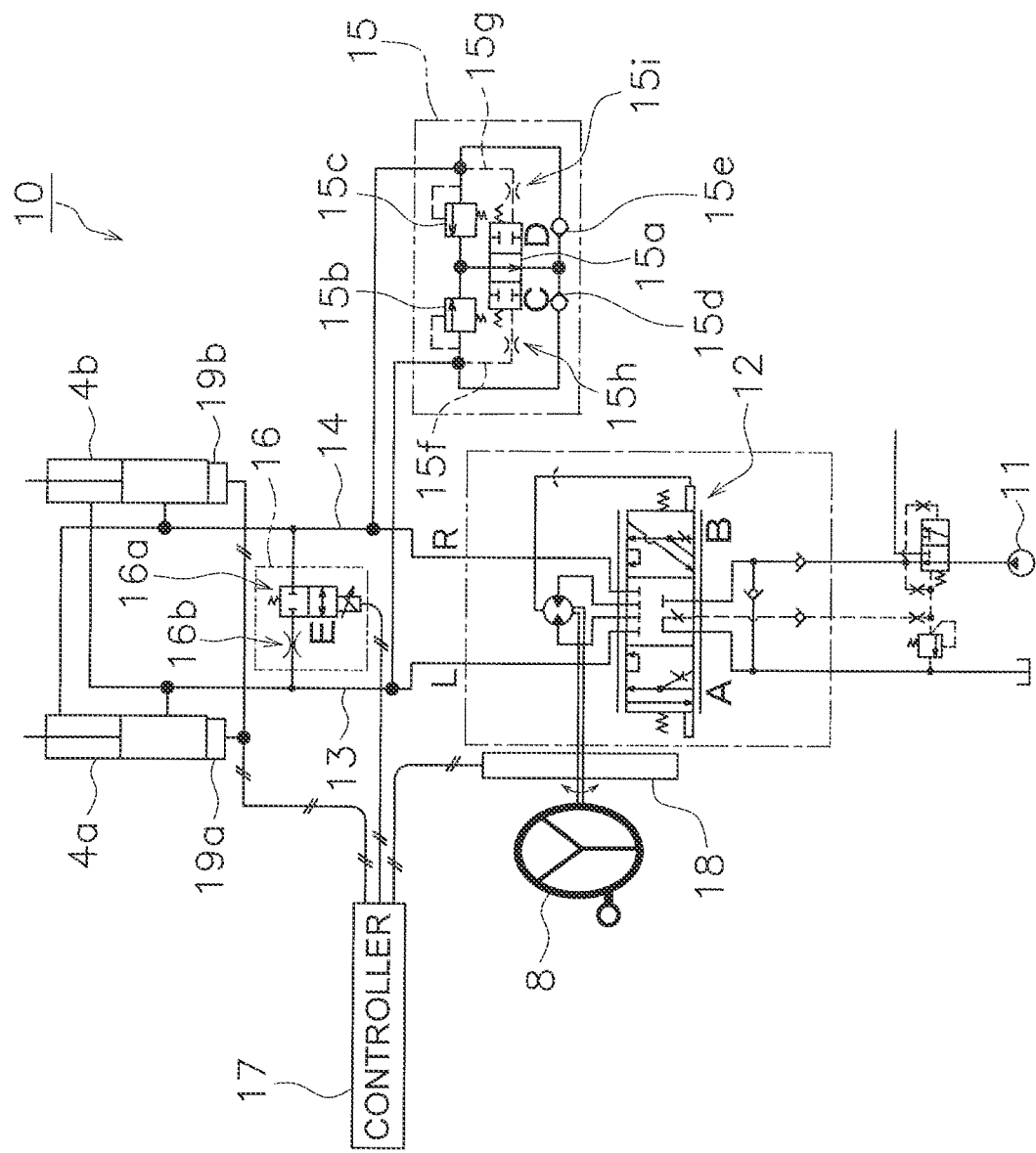
FIG. 2 is a block diagram illustrating a configuration of the wheel loader according to the embodiment.

FIG. 2 is a block diagram of a hydraulic circuit 10 of the wheel loader 1 according to the present embodiment.

The hydraulic circuit 10 is provided with a steering pump 11, a steering valve 12, a left line 13, a right line 14, a first cushioning circuit 15, a knob dislocation correction circuit/second cushioning circuit 16, a controller 17, a steering angle sensor 18, and left and right cylinder stroke sensors 19a, 19b.

The steering pump 11 is driven by an unillustrated engine. The steering pump 11 supplies hydraulic fluid to the left and right steering cylinders 4a, 4b via the steering valve 12.

When the operator turns the steering wheel 8, the steering valve 12 is able to switch from an unillustrated non-operating position (closed position) to operating positions A and B (open positions) in response to the steering direction of the steering wheel 8. The hydraulic fluid supplied from the steering pump 11 is fed from the steering valve 12 to the right line 14 when the steering valve 12 switches to the operating position A. The hydraulic fluid supplied from the steering pump 11 is fed from the steering valve 12 to the left line 13 when the steering valve 12 switches to the operating position B.

The left line 13 is connected to a base end part of the left steering cylinder 4a and to a tip end part of the right steering cylinder 4b. The right line 14 is connected to a base end part of the right steering cylinder 4b and to a tip end part of the left steering cylinder 4a.

When the steering valve 12 switches to the operating position A, the right line 14 (first line) functions as a "feed line" for feeding hydraulic fluid from the steering valve 12 to the base end part of the right steering cylinder 4b and to the tip end section of the left steering cylinder 4a. In addition, when the steering valve 12 switches to the operating position A, the left line 13 (second line) functions as a "return line" for returning the hydraulic fluid from the tip end part of the right steering cylinder 4b and from the base end part of the left steering cylinder 4a, to the steering valve 12.

When the steering valve 12 switches to the operating position B, the left line 13 functions as a "feed line" for feeding the hydraulic fluid from the steering valve 12 to the base end part of the left steering cylinder 4a and to the tip end part of the right steering cylinder 4b, and the right line 14 functions as a "return line" for returning the hydraulic fluid from the tip end part of the left steering cylinder 4a and from the base end part of the right steering cylinder 4b, to the steering valve 12.

The first cushioning circuit 15 is provided for improving operability when starting to turn the steering wheel 8. "Starting to turn" here signifies moving from a state of not operating the steering wheel 8 to a state of operating the steering wheel 8. Starting to rotate the steering wheel 8 from the neutral position to the right, and starting to rotate the steering wheel 8 from the neutral position to the left are both included in "starting to turn."

The first cushioning circuit 15 has an oil pressure control valve 15a, a first relief valve 15b, a second relief valve 15c, a first check valve 15d, a second check valve 15e, a first release flow path 15f, and a second release flow path 15g.

The oil pressure control valve 15a can be switched from an unillustrated non-operating position (open position) to operating positions C and D (closed positions). The first relief valve 15b is disposed between the left line 13 and the input side of the oil pressure control valve 15a. The second relief valve 15c is disposed between the right line 14 and the input side of the oil pressure control valve 15a.

The first check valve 15d is disposed between the left line 13 and the output side of the oil pressure control valve 15a. The first check valve 15d allows the hydraulic fluid to flow toward the left line 13 side. The second check valve 15e is disposed between the right line 14 and the output side of the oil pressure control valve 15a. The second check valve 15e allows the hydraulic fluid to flow toward the right line 14 side.

The first release flow path 15f is connected to the left line 13 and the oil pressure control valve 15a, and switches the oil pressure control valve 15a from the non-operating position (open position) to the operating position C (closed position) when hydraulic fluid is supplied. However, because the first release flow path 15f includes an orifice mechanism 15h, the first release flow path 15f switches the position of the oil pressure control valve 15a after a predetermined time period after the oil pressure in the left line 13 has risen. The second release flow path 15g is connected to the right line 14 and the oil pressure control valve 15a, and switches the oil pressure control valve 15a from the non-operating position (open position) to the operating position D (closed position) when hydraulic fluid is supplied. However, because the second release flow path 15g includes an orifice mechanism 15i, the second release flow path 15g switches the position of the oil pressure control valve 15a after a predetermined time period after the oil pressure in the right line 14 has risen.

An operation of the first cushioning circuit 15 will be explained using the case of starting to turn the steering wheel 8 to the right as an example. When starting to turn the steering wheel 8 to the right, a portion of the hydraulic fluid supplied to the left line 13 flows to the right line 14 via the oil pressure control valve 15a because hydraulic fluid is supplied to the left line 13 and then an oil pressure equal to or greater than a relief set pressure is applied to the first relief valve 15b and a relief action is performed. Thereafter, the flow of the hydraulic fluid from the left line 13 to the right line 14 is blocked due to the first release flow path 15f switching the oil pressure control valve 15a from the non-operating position to the operating position C.

In this way, because the hydraulic fluid flows from the left line 13 (feed line) to the right line 14 (return line), a sudden rise of the load pressure at the base end part of the left steering cylinder 4a and the tip end part of the right steering cylinder 4b and the generation of a shock can be suppressed during a predetermined time period from starting to turn the steering wheel 8. Even when starting to turn the steering wheel 8 to the left, because the hydraulic fluid flows from the right line 14 (feed line) to the left line 13 (return line), a sudden rise of the load pressure at the base end part of the right steering cylinder 4b and the tip end part of the left steering cylinder 4a and the generation of a shock can be suppressed during the predetermined time period from starting to turn the steering wheel 8. Therefore, the operability when starting to turn the steering wheel 8 can be improved.

The knob dislocation correction circuit/second cushioning circuit 16 is provided for correcting knob dislocation and for improving operability when returning the steering wheel 8. "Returning" here signifies moving from a state of operating the steering wheel 8 to a state of operating the steering wheel 8 in the reverse direction. Starting to rotate the steering wheel 8 to the left from the state in which the steering wheel 8 is rotated to the right, and starting to rotate the steering wheel 8 to the right from the state in which the steering wheel 8 is rotated to the left, are both included in "returning."

The knob dislocation correction circuit/second cushioning circuit 16 has an electromagnetic valve 16a and an orifice mechanism 16b.

The electromagnetic valve 16a is disposed between the left line 13 and the right line 14. The electromagnetic valve 16a can be switched from an unillustrated non-operating position (closed position) to an operating position E (open position). The switching of the positions of the electromagnetic valve 16a is performed by outputting a control current from the controller 17. The orifice mechanism 16b is disposed between the left line 13 and the electromagnetic valve 16a.

An operation of the knob dislocation correction circuit/second cushioning circuit 16 will be explained using the case of returning the steering wheel 8 from the right to the left as an example. The controller 17 opens the electromagnetic valve 16a in response to the oil pressure in the right line 14. Specifically, the controller 17 opens the electromagnetic valve 16a by moving the electromagnetic valve 16a from the non-operating position to the operating position E in response to the steering wheel returning the steering wheel 8 from the right to the left and a sudden rise in the oil pressure inside the right line 14. Thereafter, the controller 17 closes the electromagnetic valve 16a by returning the electromagnetic valve 16a from the operating position to the non-operating position after a predetermined time period from the opening of the electromagnetic valve 16a.

Even when returning the steering wheel 8 from the right to the left, because the hydraulic fluid flows from the right line 14 (feed line) to the left line 13 (return line), the sudden rise of the load pressure at the base end part of the right steering cylinder 4b and the tip end part of the left steering cylinder 4a and the generation of a shock can be suppressed during the predetermined time period after returning the steering wheel 8 from the right to the left. Similarly, because the hydraulic fluid flows from the left line 13 (feed line) to the right line 14 (return line), the sudden rise of the load pressure at the base end part of the left steering cylinder 4a and the tip end part of the right steering cylinder 4b and the generation of a shock can be suppressed during a predetermined time period after returning the steering wheel 8 from the left to the right. Therefore, the operability when returning the steering wheel 8 can be improved.

An operation of the knob dislocation correction circuit/second cushioning circuit 16 when performing the knob dislocation correction will be explained next. The knob dislocation correction signifies matching (minus correction) a desired frame angle to the actual frame angle when the actual frame angle of the front frame 2 with respect to the rear frame 3 is greater than the desired frame angle corresponding to the steering angle of the steering wheel 8. The desired frame angle is the frame angle that the operator tries to obtain by steering with the steering wheel 8. The controller 17 opens the electromagnetic valve 16a by moving the electromagnetic valve 16a from the non-operating position to the operating position E when the actual frame angle is greater than the desired frame angle. Consequently, even if, for example, the steering wheel 8 is turned to the right, the operator increases the steering angle of the steering wheel 8 because the hydraulic fluid flows from the left line 13 (feed line) to the right line 14 (return line) and it becomes difficult to turn to the right. As a result, the desired frame angle corresponding to the steering angle of the steering wheel 8 approaches the actual frame angle. Thereafter, the controller 17 closes the electromagnetic valve 16a by returning the electromagnetic valve 16a from the operating position to the non-operating position when the actual frame angle is sufficiently close to the desired frame angle. In this way, according to the knob dislocation correction circuit/second cushioning circuit 16, the knob dislocation correction can be carried out easily with a simple configuration using the electromagnetic valve 16a.

As described above, according to the hydraulic circuit 10 as in the present embodiment, shock can be suppressed and knob dislocation can be corrected with a simple configuration when starting to turn or when returning the steering wheel 8.

The controller 17 opens the electromagnetic valve 16a in response to a sudden rise in the oil pressure in the line that serves as the feed line among the left line 13 and the right line 14. Consequently, the operability when returning the steering wheel 8 can be improved. The controller 17 is able to sense a sudden rise in the oil pressure in the feed line on the basis of variation of the steering angle of the steering wheel 8 detected by the steering angle sensor 18. Specifically, the controller 17 senses a sudden rise in the oil pressure in the feed line by detecting a variation of the steering angle when the steering wheel 8 is returned from the right to the left and when the steering wheel is returned from the left to the right. At this time, the controller 17 is able to sense the sudden rise of the oil pressure in the feed line on the basis of a change in the handling angle being equal to or greater than a predetermined threshold within a predetermined time period.

However, the controller 17 may sense that the oil pressure in the feed line has risen suddenly on the basis of variation of the oil pressure in the feed line detected by an oil pressure sensor. At this time, the controller 17 is able to sense the sudden rise of the oil pressure in the feed line on the basis of a change in the oil pressure being equal to or greater than a predetermined threshold within a predetermined time period.

In addition, the controller 17 opens the electromagnetic valve 16a in response to the actual frame angle of the front frame 2 with respect to the rear frame 3 being greater than the desired frame angle corresponding to the steering angle of the steering wheel 8. Consequently, the knob dislocation correction is performed as indicated above. The controller 17 obtains the actual frame angle of the front frame 2 with respect to the rear frame 3 on the basis of the respective stroke amounts of the left and right steering cylinders 4a, 4b detected by the left and right stroke sensors 19a, 19b. However, the controller 17 may obtain the actual frame angle from a frame angle sensor that is able to directly detect the actual frame angle.

First Modified Example

Figure 3:
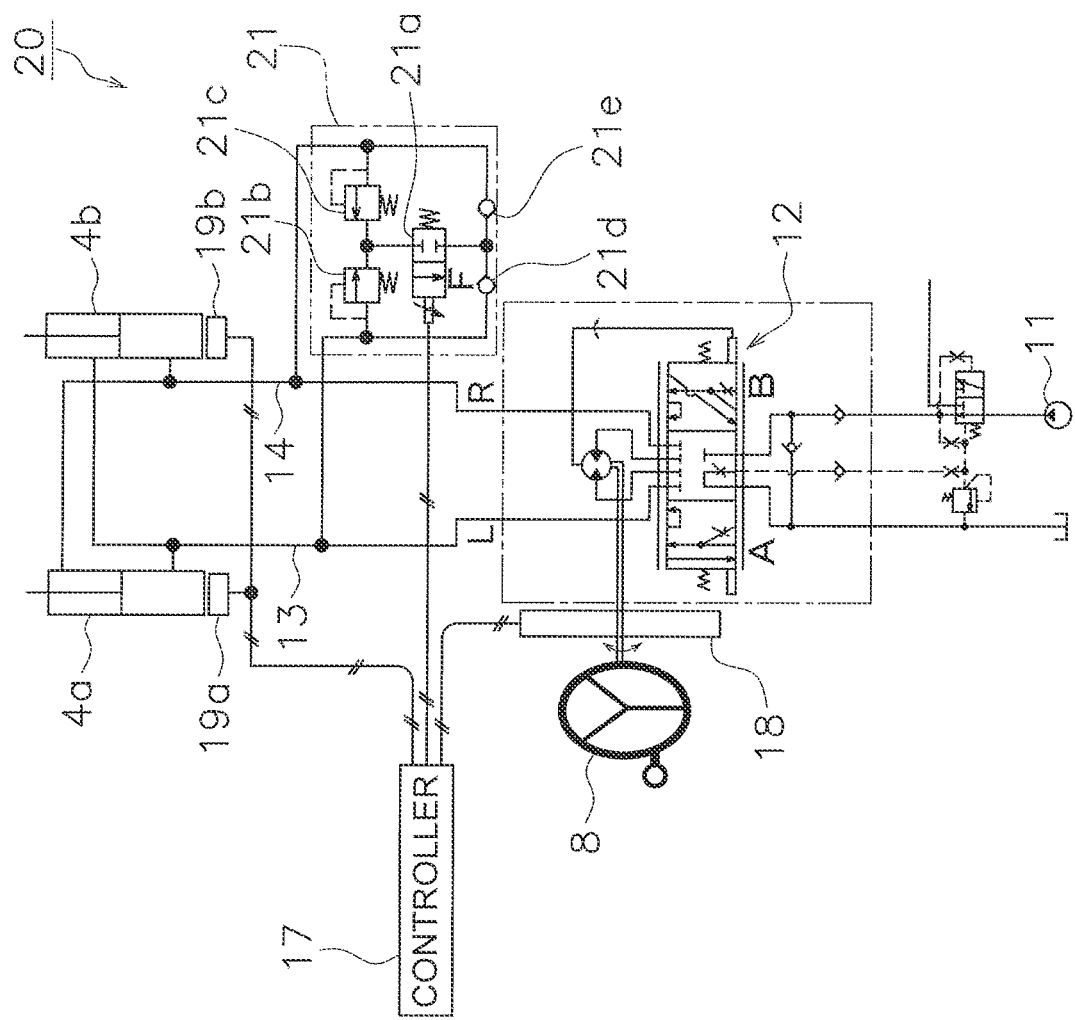
FIG. 3 is a block diagram illustrating a configuration of the wheel loader according to a first modified example.

A configuration of a hydraulic circuit 20 according to a first embodiment will be explained with reference to FIG. 3. The difference between the hydraulic circuit 20 of the first modified example and the hydraulic circuit 10 according to the above embodiment is that the hydraulic circuit 20 of the first modified example is provided with a cushioning circuit 20 in place of the first cushioning circuit 15 and the knob dislocation correction circuit/second cushioning circuit 16. The above difference will mainly be explained hereinbelow.

The cushioning circuit 21 is provided to improve the operability when starting to turn and when returning the steering wheel 8, and to correct knob dislocation.

The cushioning circuit 21 has an electromagnetic valve 21a, a first relief valve 21b, a second relief valve 21c, a first check valve 21d, and a second check valve 21e.

The electromagnetic valve 21a is disposed between the left line 13 and the right line 14. The electromagnetic valve 21a is a "proportional solenoid valve" that can switch from an unillustrated non-operating position (closed position) to an operating position F (open position) in response to the size of a control current outputted by the controller 17. The controller 17 opens the electromagnetic valve 16a in response to a sudden rise in the oil pressure in the line that serves as the feed line among the left line 13 and the right line 14. In addition, the controller 17 opens the electromagnetic valve 16a in response to the actual frame angle of the front frame 2 with respect to the rear frame 3 being greater than the desired frame angle corresponding to the steering angle of the steering wheel 8.

The first relief valve 21b is disposed between the left line 13 and the input side of the electromagnetic valve 21a. The second relief valve 21c is disposed between the right line 14 and the input side of the electromagnetic valve 21a.

The first check valve 21d is disposed between the left line 13 and the output side of the electromagnetic valve 21a. The first check valve 21d allows the hydraulic fluid to flow toward the left line 13 side. The second check valve 21e is disposed between the right line 14 and the output side of the electromagnetic valve 21a. The second check valve 21e allows the hydraulic fluid to flow toward the right line 14 side.

Firstly, an operation of the cushioning circuit 21 will be explained using the case of starting to turn the steering wheel 8 to the right as an example. When starting to turn the steering wheel 8 to the right, hydraulic fluid is supplied to the left line 13 and an oil pressure equal to or greater than a relief set pressure is applied to the first relief valve 21b and a relief action is performed, and the controller 17 opens the electromagnetic valve 16a only for a predetermined time period in response to a sudden rise in the oil pressure in the left line 13. The controller 17 then closes the electromagnetic valve 16a after the predetermined time period has elapsed.

In this way, because the hydraulic fluid flows from the left line 13 (feed line) to the right line 14 (return line), the sudden rise of the load pressure at the base end part of the left steering cylinder 4a and the tip end part of the right steering cylinder 4b and the generation of a shock can be suppressed during a predetermined time period from starting to turn the steering wheel 8. The above operation is the same when starting to turn the steering wheel 8 to the left. Therefore, the operability when starting to turn the steering wheel 8 can be improved.

An operation of the cushioning circuit 21 will be explained next using the case of returning the steering wheel 8 from the right to the left as an example. Specifically, the controller 17 opens the electromagnetic valve 21a by moving the electromagnetic valve 21a from the non-operating position to the operating position F in response to the steering wheel returning from the right to the left and a sudden rise in the oil pressure inside the right line 14. Thereafter, the controller 17 closes the electromagnetic valve 21a by returning the electromagnetic valve 21a from the operating position to the non-operating position after a predetermined time period from the opening of the electromagnetic valve 21a.

Even when returning the steering wheel 8 from the right to the left, because the hydraulic fluid flows from the right line 14 (feed line) to the left line 13 (return line), the sudden rise of the load pressure at the base end part of the right steering cylinder 4b and the tip end part of the left steering cylinder 4a and the generation of a shock can be suppressed during the predetermined time period from returning the steering wheel 8 from the right to the left. The above operation is the same when returning the steering wheel 8 from the left to the right. Therefore, the operability when returning the steering wheel 8 can be improved.

An operation of the cushioning circuit 21 when performing the knob dislocation correction will be explained next. The controller 17 opens the electromagnetic valve 21a by moving the electromagnetic valve 21a from the non-operating position to the operating position F when the actual frame angle is greater than the desired frame angle. Consequently, even if, for example, the steering wheel 8 is turned to the right, the operator increases the steering angle of the steering wheel 8 because the hydraulic fluid flows from the left line 13 (feed line) to the right line 14 (return line) and it becomes difficult to turn to the right. As a result, the desired frame angle corresponding to the steering angle of the steering wheel 8 approaches the actual frame angle. Thereafter, the controller 17 closes the electromagnetic valve 21a by returning the electromagnetic valve 21a from the operating position to the non-operating position when the actual frame is angle sufficiently close to the desired frame angle.

As described above, according to the hydraulic circuit 20 as in the first modified example, shock can be reduced and knob dislocation can be corrected with a simple configuration when starting to turn or when returning the steering wheel 8.

Second Modified Example

Figure 4:
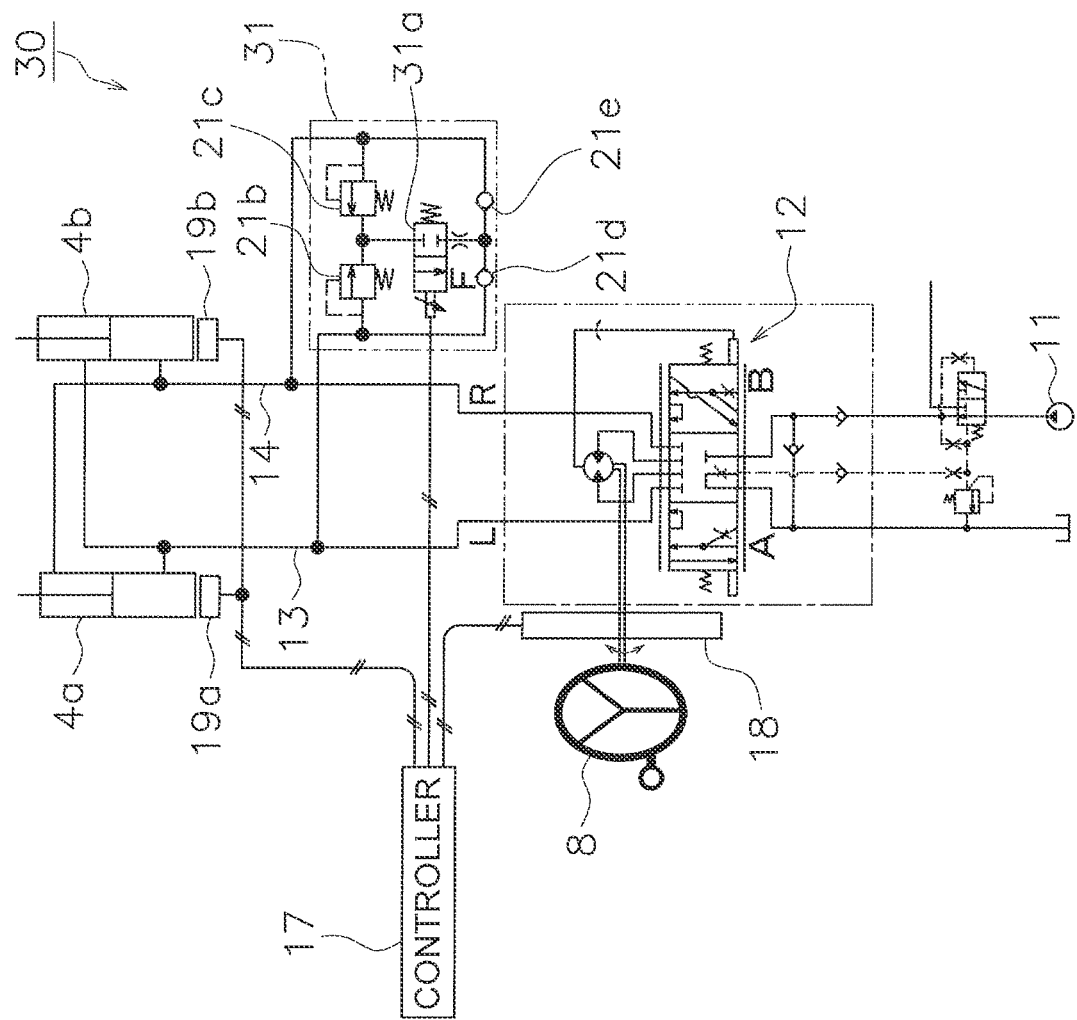
FIG. 4 is a block diagram illustrating a configuration of the wheel loader according to a second modified example.

A hydraulic circuit 30 according to a second modified example will be explained with reference to FIG. 4. The difference between the hydraulic circuit 30 and the hydraulic circuit 20 according to the first modified example is that an electromagnetic valve 31a is used in the hydraulic circuit 30 of the second modified example, in place of the electromagnetic valve 21a. The above difference will mainly be explained hereinbelow.

A cushioning circuit 31 according to the second modified example has the electromagnetic valve 31a.

The electromagnetic valve 31a is disposed between the left line 13 and the right line 14. The electromagnetic valve 31a is an "ON/OFF solenoid valve" that is held in an unillustrated non-operating position (closed position) when no control current is outputted by the controller 17, and switches to an operating position F (open position) when a control current is outputted by the controller 17.

In this way, the hydraulic circuit 30 according to the second modified example is the same as the hydraulic circuit 20 according to the first modified example except for the use of the ON/OFF solenoid valve as the electromagnetic valve 31a. As a result, the operation of the cushioning circuit 31 according to the second modified example is the same as the operation of the cushioning circuit 21 explained above with regard to the first modified example.

Third Modified Example

Figure 5:
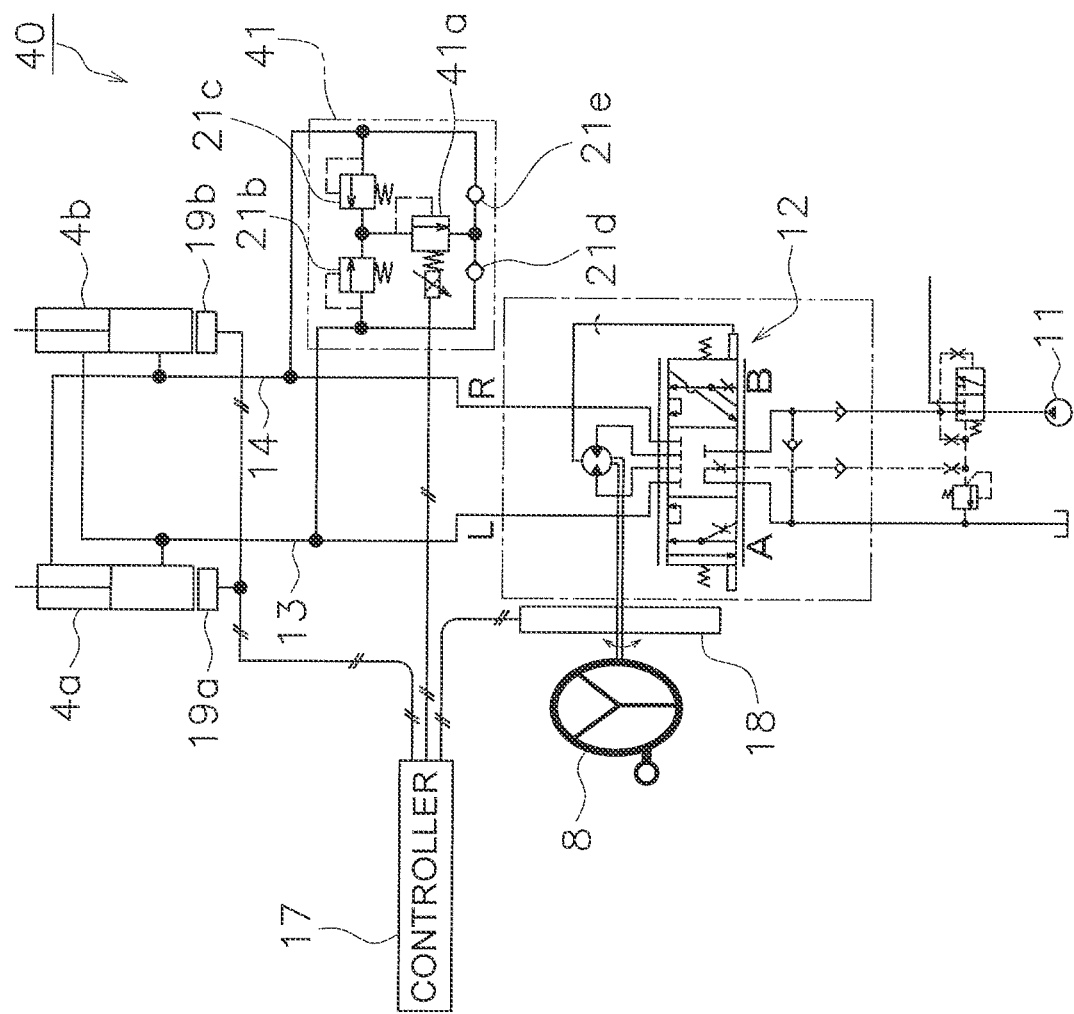
FIG. 5 is a block diagram illustrating a configuration of the wheel loader according to a third modified example.

A hydraulic circuit 40 according to a third modified example will be explained with reference to FIG. 5. The difference between the hydraulic circuit 40 and the hydraulic circuit 20 according to the first modified example is that an electromagnetic valve 41a is used in the hydraulic circuit 40 of the third modified example in place of the electromagnetic valve 21a. The above difference will mainly be explained hereinbelow.

A cushioning circuit 41 according to the third modified example has the electromagnetic valve 41a.

The electromagnetic valve 41a is disposed between the left line 13 and the right line 14. The electromagnetic valve 41a is an "electromagnetic variable relief valve" that is set so that the relief set pressure is high when no control current is outputted by the controller 17, and the relief set pressure is low when a control current is outputted by the controller 17. When no control current is outputted by the controller 17, the relief set pressure of the electromagnetic valve 41a is set to be higher than the oil pressure in the feed line. When a control current is outputted by the controller 17, the relief set pressure of the electromagnetic valve 41a is set to be lower than the oil pressure in the feed line.

In this way, the hydraulic circuit 40 according to the third modified example is the same as the hydraulic circuit 20 according to the first modified example except for the use of the "electromagnetic variable relief valve" as the electromagnetic valve 41a. As a result, the operation of the cushioning circuit 41 according to the third modified example is the same as the operation of the cushioning circuit 21 explained above with regard to the first modified example.

Fourth Modified Example

Figure 6:
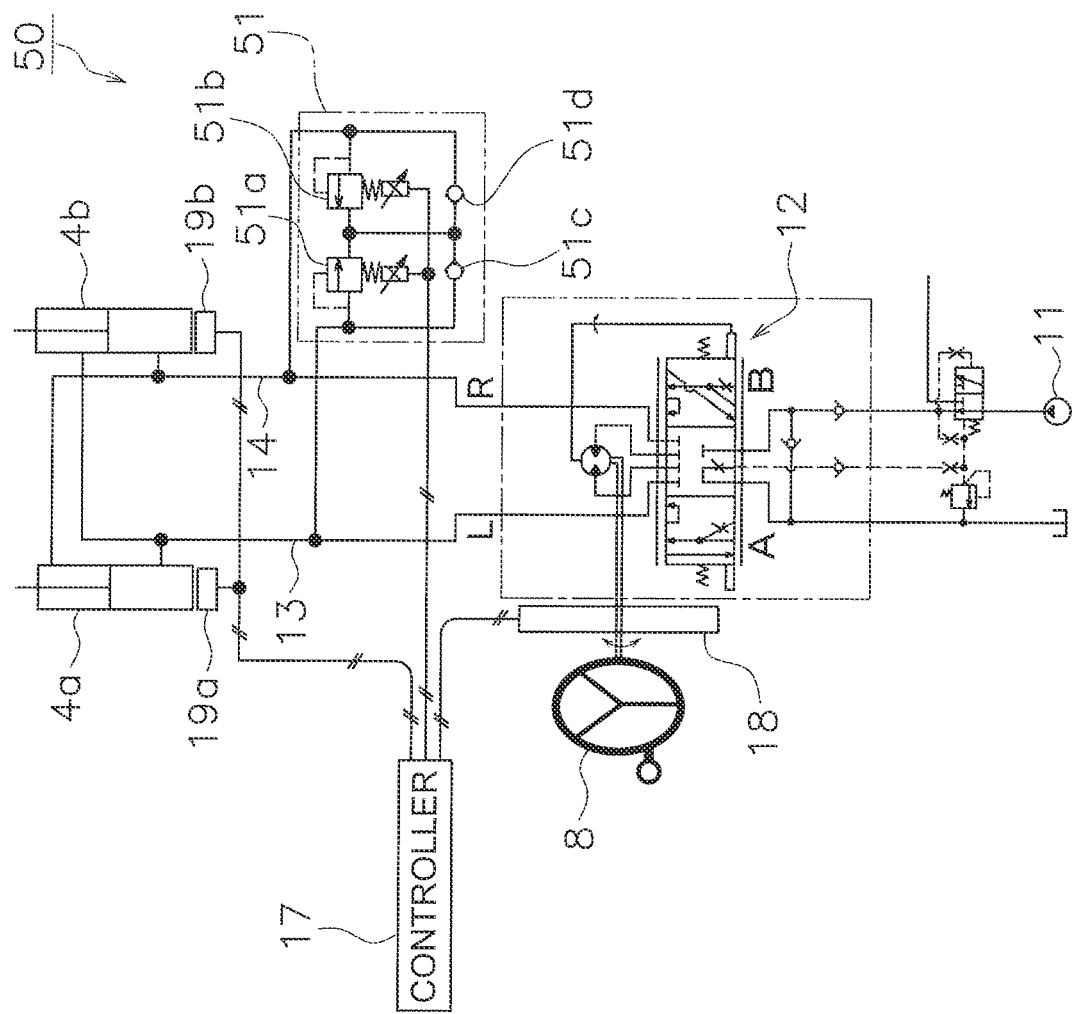
FIG. 6 is a block diagram illustrating a configuration of the wheel loader according to a fourth modified example.

A hydraulic circuit 50 according to a fourth modified example will be explained with reference to FIG. 6. The difference between the hydraulic circuit 50 and the hydraulic circuit 20 according to the first modified example is that a cushioning circuit 51 is used in the hydraulic circuit 40 of the third modified example in place of the cushioning circuit 21. The above difference will mainly be explained hereinbelow.

The cushioning circuit 51 according to the fourth modified example has a first electromagnetic valve 51a, a second electromagnetic valve 51b, a first check valve 51c, and a second check valve 51d.

The first electromagnetic valve 51a is disposed between the left line 13 and the second electromagnetic valve 51b. The first electromagnetic valve 51a is an "electromagnetic variable relief valve" that is set so that the relief set pressure is high when no control current is outputted by the controller 17, and the relief set pressure is low when a control current is outputted by the controller 17.

The second electromagnetic valve 51b is disposed between the right line 14 and the first electromagnetic valve 51a. The second electromagnetic valve 51b is an "electromagnetic variable relief valve" that is set so that the relief set pressure is high when no control current is outputted by the controller 17, and the relief set pressure is low when a control current is outputted by the controller 17.

When no control current is outputted by the controller 17, the respective relief set pressures of the first electromagnetic valve 51a and the second electromagnetic valve 51b are set to be higher than the oil pressure in the feed line. When a control current is outputted by the controller 17, the respective relief set pressures of the first electromagnetic valve 51a and the second electromagnetic valve 51b are set to be lower than the oil pressure in the feed line.

The first check valve 51c is disposed between the left line 13 and the respective output sides of the first electromagnetic valve 51a and the second electromagnetic valve 51b. The first check valve 51c allows the hydraulic fluid to flow toward the left line 13 side. The second check valve 51d is disposed between the right line 14 and the respective output sides of the first electromagnetic valve 51a and the second electromagnetic valve 51b. The second check valve 51d allows the hydraulic fluid to flow toward the right line 14 side.

Firstly, an operation of the cushioning circuit 51 will be explained using the case of starting to turn the steering wheel 8 to the right as an example. When the turning of the steering wheel 8 to the right is started and hydraulic fluid is supplied to the left line 13, the controller 17 outputs a control current to the first electromagnetic valve 51a when the oil pressure in the left line 13 rises suddenly. As a result, the relief set pressure of the first electromagnetic valve 51a is set to be lower than the oil pressure in the left line 13 and the first electromagnetic valve 51a performs a relief action. Thereafter, the controller 17 stops the output of the control current to the first electromagnetic valve 51a when a predetermined time period has elapsed. As a result, the relief set pressure of the first electromagnetic valve 51a is set to be higher than the oil pressure in the left line 13 and the first electromagnetic valve 51a is closed.

In this way, because the hydraulic fluid flows from the left line 13 (feed line) to the right line 14 (return line), a sudden rise of the load pressure at the base end part of the left steering cylinder 4a and the tip end part of the right steering cylinder 4b and the generation of a shock can be suppressed during a predetermined time period from starting to turn the steering wheel 8. The above operation is the same when starting to turn the steering wheel 8 to the left. Therefore, the operability when starting to turn the steering wheel 8 can be improved.

An operation of the cushioning circuit 51 will be explained next using the case of returning the steering wheel 8 from the right to the left as an example. When the steering wheel is returned from the right to the left and the oil pressure in the right line 14 rises suddenly, the controller 17 outputs a control current to the second electromagnetic valve 51b to cause the second electromagnetic valve 51b to perform a relief action. Thereafter, the controller 17 stops the output of the control current to the second electromagnetic valve 51b when a predetermined time period has elapsed, whereby the second electromagnetic valve 51b is closed.

Even when returning the steering wheel 8 from the right to the left, because the hydraulic fluid flows from the right line 14 (feed line) to the left line 13 (return line), the sudden rise of the load pressure at the base end part of the right steering cylinder 4b and the tip end part of the left steering cylinder 4a and the generation of a shock can be suppressed during the predetermined time period from returning the steering wheel 8 from the right to the left. The above operation is the same when returning the steering wheel 8 from the left to the right. Therefore, the operability when returning the steering wheel 8 can be improved.

The operation of the cushioning circuit 51 when correcting knob dislocation when the steering wheel 8 is operated to the right will be explained next. The controller 17 causes the first electromagnetic valve 51a to perform a relief action by outputting a control current to the first electromagnetic valve 51*a* when the actual frame angle is greater than the desired frame angle. Thereafter, the controller 17 closes the first electromagnetic valve 51*a* by stopping the output of the control current to the first electromagnetic valve 51*a* when the actual frame is angle sufficiently close to the desired frame angle.

The operation of the cushioning circuit 51 when correcting knob dislocation when the steering wheel 8 is turned to the left will be explained next. The controller 17 causes the second electromagnetic valve 51*b* to perform a relief action by outputting a control current to the second electromagnetic valve 51*b* when the actual frame angle is greater than the desired frame angle. Thereafter, the controller 17 closes the second electromagnetic valve 51*b* by stopping the output of the control current to the second electromagnetic valve 51*b* when the actual frame is angle sufficiently close to the desired frame angle.

As described above, according to the hydraulic circuit 50 as in the fourth modified example, shock can be reduced and knob dislocation can be corrected with a simple configuration when starting to turn or when returning the steering wheel 8.

Other Embodiments

While a case in which the hydraulic circuit according to the present invention is applied to a wheel loader has been explained in the embodiment and the modified examples, the hydraulic circuit according to the present invention may also be applied to a motor grader, a dump truck, a forklift, or the like.

What is claimed is:

1. A work vehicle comprising:
a steering wheel;
a steering angle sensor that detects a steering angle of the steering wheel;
a steering cylinder;
a steering valve configured to supply hydraulic fluid to the steering cylinder in response to steering of the steering wheel;
a feed line configured to feed the hydraulic fluid from the steering valve to the steering cylinder;
a return line configured to return the hydraulic fluid from the steering cylinder to the steering valve;
an electromagnetic valve disposed between the feed line and the return line; and
a controller configured to open the electromagnetic valve in response to determining that the steering angle detected by the steering angle sensor has undergone a variation indicating a sudden rise of the oil pressure in the feed line when the steering wheel is returned from a turned state.

2. A work vehicle comprising:
a steering wheel;
a steering cylinder;
a steering valve configured to supply hydraulic fluid to the steering cylinder in response to steering of the steering wheel;
a feed line configured to feed the hydraulic fluid from the steering valve to the steering cylinder;
a return line configured to return the hydraulic fluid from the steering cylinder to the steering valve;
an electromagnetic valve disposed between the feed line and the return line;
a steering angle sensor configured to detect a steering angle of the steering wheel;
a front frame;
a rear frame coupled to the front frame via the steering cylinder; and
a controller configured to open the electromagnetic valve in response to an oil pressure in the feed line, the controller being further configured to open the electromagnetic valve when an actual frame angle of the front frame with respect to the rear frame is larger than a desired frame angle corresponding to the steering angle detected by the steering angle sensor.

3. The work vehicle according to claim 2, further comprising:
a stroke sensor configured to detect a stroke amount of the steering cylinder,
the controller being further configured to obtain the actual frame angle based on the stroke amount detected by the stroke sensor.

4. The work vehicle according to claim 2, wherein the actual frame angle is detected directly.

5. A work vehicle comprising:
a steering wheel;
a steering cylinder;
a steering valve configured to supply hydraulic fluid to the steering cylinder in response to steering of the steering wheel;
a feed line configured to feed the hydraulic fluid from the steering valve to the steering cylinder;
a return line configured to return the hydraulic fluid from the steering cylinder to the steering valve;
an electromagnetic valve disposed between the feed line and the return line;
a controller configured to open the electromagnetic valve in response to an oil pressure in the feed line;
a first relief valve disposed between the feed line and an input side of the electromagnetic valve;
a second relief valve disposed between the return line and the input side of the electromagnetic valve;
a first check valve disposed between the feed line and an output side of the electromagnetic valve; and
a second check valve disposed between the return line and the output side of the electromagnetic valve,
the first check valve allowing the hydraulic fluid to flow to the feed line, and
the second check valve allowing the hydraulic fluid to flow to the return line.

6. The work vehicle according to claim 1, further comprising:
a cushioning circuit connected to the feed line and the return line in parallel to the electromagnetic valve, the cushioning circuit including
an oil pressure control valve,
a first relief valve disposed between the feed line and an input side of the oil pressure control valve,
a second relief valve disposed between the return line and the input side of the oil pressure control valve,
a first check valve disposed between the feed line and an output side of the oil pressure control valve, and
a second check valve disposed between the return line and the output side of the oil pressure control valve,
a first release flow path connected to the feed line and the oil pressure control valve and configured to switch the oil pressure control valve from an open position to a closed position when the hydraulic fluid is supplied, and
a second release flow path connected to the return line and the oil pressure control valve and configured to switch the oil pressure control valve from the open position to the closed position when the hydraulic fluid is supplied, the first check valve allowing the hydraulic fluid to flow to the feed line, the second check valve allowing the hydraulic fluid to flow to the return line, and the first release path and the second release flow path each including an orifice mechanism.

7. The work vehicle according to claim 2, further comprising:

a steering angle sensor that detects a steering angle of the steering wheel, the controller being configured to open the electromagnetic valve in response to determining that steering angle detected by the steering angle sensor has undergone a variation indicating a sudden rise of the oil pressure in the feed line when the steering wheel is returned from a turned state.

8. The work vehicle according to claim 5, further comprising:

a steering angle sensor that detects a steering angle of the steering wheel, the controller being configured to open the electromagnetic valve in response to determining that steering angle detected by the steering angle sensor has undergone a variation indicating a sudden rise of the oil pressure in the feed line when the steering wheel is returned from a turned state.

\* \* \* \* \*